United States Patent
Qi (10) Patent No.: US 11,816,496 B2
(45) Date of Patent: Nov. 14, 2023

(54) MANAGING CONTAINERS USING ATTRIBUTE/VALUE PAIRS

(71) Applicant: MICRO FOCUS LLC, Santa Clara, CA (US)

(72) Inventor: Ke-Ke Qi, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 473 days.

(21) Appl. No.: 16/636,293

(22) PCT Filed: Aug. 31, 2017

(86) PCT No.: PCT/CN2017/099799
§ 371 (c)(1),
(2) Date: Feb. 3, 2020

(87) PCT Pub. No.: WO2019/041206
PCT Pub. Date: Mar. 7, 2019

(65) Prior Publication Data
US 2021/0182091 A1    Jun. 17, 2021

(51) Int. Cl.
*G06F 9/455* (2018.01)
*G06F 9/445* (2018.01)

(52) U.S. Cl.
CPC ...... *G06F 9/45558* (2013.01); *G06F 9/44505* (2013.01); *G06F 2009/4557* (2013.01); *G06F 2009/45562* (2013.01); *G06F 2009/45587* (2013.01)

(58) Field of Classification Search
None
See application file for complete search history.

(56) References Cited

U.S. PATENT DOCUMENTS

| 7,987,461 B2 | 7/2011 | Agrawal |
| 8,290,949 B2 | 10/2012 | Baker |
| 8,918,448 B2 | 12/2014 | Deluca |
| 2008/0133486 A1 | 6/2008 | Fitzgerald |

(Continued)

FOREIGN PATENT DOCUMENTS

| CN | 105512083 A | 4/2016 |
| CN | 106445473 A | 2/2017 |

(Continued)

OTHER PUBLICATIONS

Kang et al., LMS: Label Management Service for Intent-driven Cloud Management, May 2017, 2017 IFIP/IEEE Symposium on Integrated Network and Service Management (IM), p. 177-185 (Year: 2017).*

(Continued)

*Primary Examiner* — Lewis A Bullock, Jr.
*Assistant Examiner* — Melissa A Headly
(74) *Attorney, Agent, or Firm* — Sheridan Ross P.C.

(57) ABSTRACT

A computer implemented method includes: accessing from a configuration management database, by a virtualization manager, configuration data for a first computing node of a computing system; generating, by the virtualization manager, a set of attribute/value pairs for the first computing node using the configuration data; and managing, by the virtualization manager, a first container on the first computing node using the set of attribute/value pairs for the first computing node.

16 Claims, 6 Drawing Sheets

(56) References Cited

U.S. PATENT DOCUMENTS

| | | |
|---|---|---|
| 2008/0243900 A1 | 10/2008 | Yohanan |
| 2009/0222880 A1 | 9/2009 | Mayer |
| 2010/0017368 A1 | 1/2010 | Mao |
| 2010/0293270 A1 | 11/2010 | Augenstein |
| 2013/0238785 A1 | 9/2013 | Hawk |
| 2014/0279808 A1 | 9/2014 | Strassner |
| 2015/0160926 A1 | 6/2015 | Larson |
| 2018/0019969 A1* | 1/2018 | Murthy ............... H04L 61/2007 |
| 2018/0349174 A1* | 12/2018 | Vyas .................... G06F 9/5077 |

FOREIGN PATENT DOCUMENTS

| | | |
|---|---|---|
| CN | 106708622 A | 5/2017 |
| CN | 106776005 A | 5/2017 |
| CN | 106919445 A | 7/2017 |

OTHER PUBLICATIONS

Introduction to Container Orchestration; https://dzone.com/articles/introduction-to-container-orchestration; Aug. 1, 2016; International Search Report/Written Opinion; PCT/CN2017099799; dated Dec. 25, 2017; 11 Pages.

* cited by examiner

MANAGING CONTAINERS USING ATTRIBUTE/VALUE PAIRS

BACKGROUND

Virtualization technology can enable a computer system to provide one or more virtual computing environments. For example, some virtual computing environments may provide an abstraction of a physical computer, and may include virtualized components representing the hardware components of the physical computer. In some examples, a single physical computer may host multiple virtual computing environments that can execute independently of each other.

BRIEF DESCRIPTION OF THE DRAWINGS

Some implementations are described with respect to the following figures.

DETAILED DESCRIPTION

Various types of virtualization technologies can reflect different levels of abstraction of a computing platform. For example, some types of virtualization technologies can represent complete computing platforms, including hardware and software components. Such virtual computing platforms may be referred to herein as "virtual machines." Further, other types of virtualization technologies may provide isolated computing environments that share can multiple instances of a single operating system. Such isolated computing environments may be referred to herein as "containers" or "operating-system level virtual environments." In some examples, a virtual machine or container may be deployed on a "node," which may be a host device, a virtual machine, a container, and so forth.

Some virtualization technologies may allow users to specify attribute-value pairs referred to herein as "labels." For example, a user may tag a container with the label "stage: testing" to indicate that the container is designated for use in a testing stage. However, different users may specify different label formats to refer to the same attribute, and may thus result in non-standard and inconsistent labelling of the container. Further, if a change occurs to an attribute of a container or a node, any labels corresponding to the changed attribute are not automatically updated to reflect a new value. Accordingly, such outdated labels may cause the container to be improperly assigned to a node.

In accordance with some implementations, examples are provided for generating and updating resource labels based on configuration data from a configuration management database (CMDB). As discussed below with reference to FIGS. 1-6, some implementations may provide automated and standardized label generation and update. Further, some implementations may include using the generated and updated labels to automatically manage containers on one or more nodes. Accordingly, some implementations may provide automated management of containers and associated labels in an efficient manner.

Figure 1:
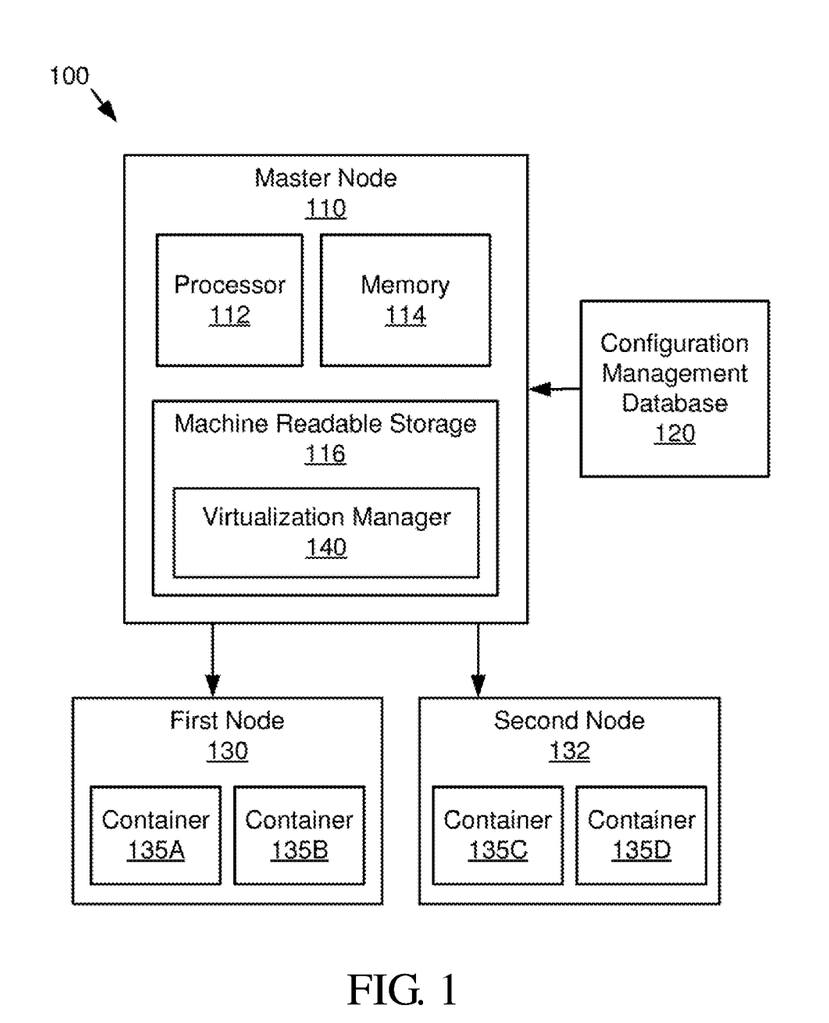
FIG. 1 is a schematic diagram of an example system, in accordance with some implementations.

Referring to FIG. 1, shown a schematic diagram of an example system 100, in accordance with some implementations. As shown, in some implementations, the system 100 may include a master node 110, a configuration management database 120, first node 130, and second node 132.

In some implementations, the master node 110 may be a computing device with hardware components, including a processor 112, memory 116, and machine-readable storage device 116. For example, the master node 110 may be implemented in a server, a desktop computer, an appliance, a laptop, a computing cluster, and so forth. In some implementations, the first node 130 and/or the second node 132 may be computing devices including hardware components (e.g., processors, memory, storage, etc.) (not shown in FIG. 1). Further, in other implementations, the first node 130 and/or the second node 132 may be virtual machines or containers hosted in a computing device, such as the master node 110 or another computing device.

In some implementations, the processor 112 may include a microprocessor, a microcontroller, a processor module or subsystem, a programmable integrated circuit, a programmable gate array, multiple processors, a microprocessor including multiple processing cores, or another control or computing device. The memory 114 can be any type of computer memory (e.g., dynamic random-access memory (DRAM), static random-access memory (SRAM), etc.).

In some implementations, the machine-readable storage 116 can include non-transitory storage media such as hard drives, flash storage, optical disks, etc. As shown, the machine-readable storage 116 can include a virtualization manager 140. In some implementations, the virtualization manager 140 may be a software application executable by the processor 112 to manage the containers 135A-135D deployed in the first node 130 and second node 132. As used herein, "managing a container" may include deploying a container to a node, modifying a deployed container, moving a container from one container to another, terminating a container, generating report and performance data for a container, generating user alerts regarding a container, and so forth.

In some implementations, the containers 135A-135D (also referred to generally as "containers 135") may include or otherwise provide an instance of a computing application (not shown in FIG. 1). For example, one or more containers 135 may provide a commerce website, a database, a customer service application, and so forth.

In some implementations, the configuration management database 120 may store configuration data for computing resources of the system 100, including hardware and/or virtual components of the master node 110, first node 130, and second node 132. In some implementations, the configuration management database 120 may be updated by an automated configuration discovery process of the system 100 (e.g., continuous scan, periodic polling, etc.).

In some implementations, the virtualization manager 140 may access the configuration management database 120, and may use stored configuration data to automatically generate and update attribute-value pairs or "labels" of components of the system 100 (e.g., first node 130, second node 132, containers 135, etc.). For example, upon an initialization of the second node 132, the virtualization manager 140 may access configuration data to generate labels for the second node 132. In another example, upon detecting a configuration change of the second node 132, the virtualization manager 140 may modify a corresponding label of the second node 132 to reflect the configuration change. In still another example, the virtualization manager 140 may access configuration data to generate and update labels for each container 135.

In some implementations, the labels generated and updated by the virtualization manager 140 may be based on any configuration associated with a resource. For example, labels may include identifiers (e.g., model numbers, serial numbers, owners, stages, etc.) characteristics and/or capabilities (e.g., processing speed, network throughput, storage capacity, encryption type, encryption level, etc.), protocols, settings, parameters, and so forth.

In some implementations, the virtualization manager 140 may manage the containers 135 based on the generated and updated labels. For example, the virtualization manager 140 may compare requirements of containers 135 to labels of first node 130 and second node 132, and may perform management actions for the containers 135 based on this comparison (e.g., deploying a container on a node, modifying a container on a node, sending an alert, etc.). In some implementations, the labels of a container 135 may specify the requirements of that container 135.

In some implementations, the labels generated and updated by the virtualization manager 140 may be used to provide analysis and reporting for the system 100. For example, the generated and updated labels may be used to identify ineffective resource utilization (e.g., a low-priority container 135 that has been deployed on a high-priority node 130). In another example, the generated and updated labels may be used to identify low performance execution (e.g., a high-workload container 135 that has been deployed on a low-performance node 132). In yet another example, the generated and updated labels may be used to generate inventory reports of all containers 135 having a particular label (e.g., "stage: development"). In still another example, the generated and updated labels may be used to monitor containers and generate performance metrics.

In some implementations, the labels generated and updated by the virtualization manager 140 may be used to generate user alerts of specified events or system errors. For example, the generated and updated labels may be used to identify a scheduling error (e.g., a container 135 requiring encryption that has been deployed on a node 130 that lacks encryption). In response to identifying the scheduling error, an alert message may be sent to notify a human user (e.g., a system administrator).

Figure 2:
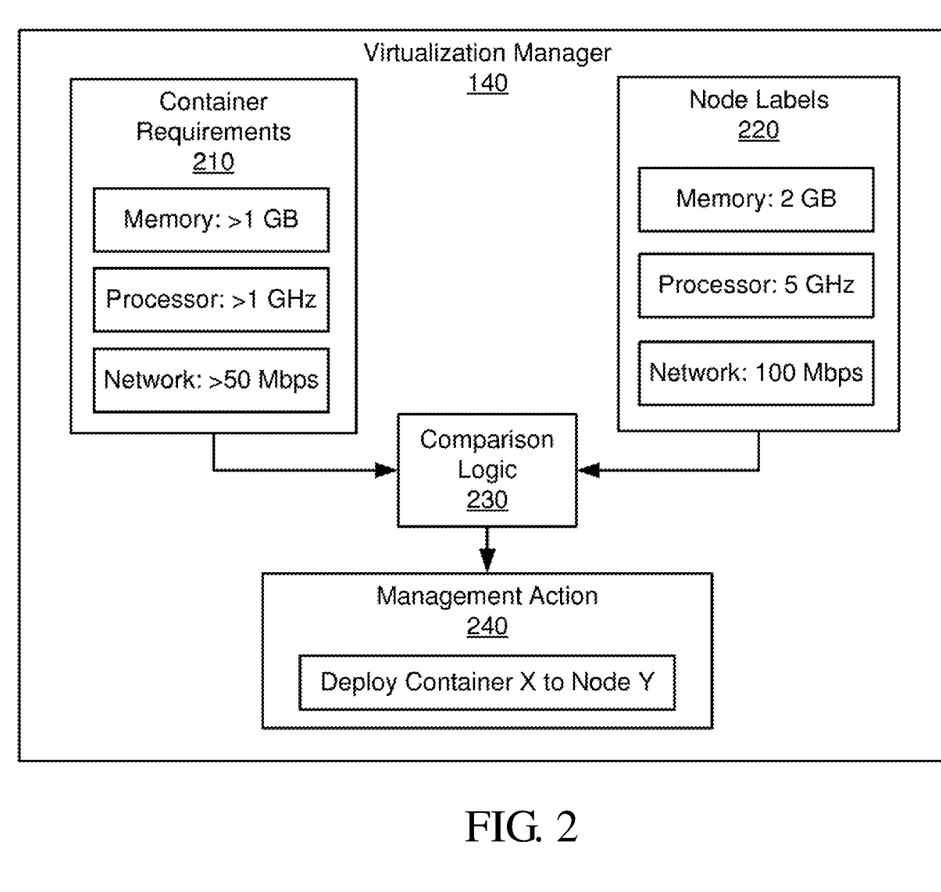
FIG. 2 is a diagram of example implementation of a virtualization manager, in accordance with some implementations.

Referring now to FIG. 2, shown is an example implementation of the virtualization manager 140. As shown in FIG. 2, the virtualization manager 140 may include comparison logic 230 to compare container requirements 210 to node labels 220. If all of the container requirements 210 are satisfied by data in the node labels 220, the comparison logic 230 may determine a management action 240 to specify that a given container is deployed to a particular node. For example, assume that the container requirements 210 represent requirements of container 135D (shown in FIG. 1), including a minimum memory size of 1 GB, a minimum processor speed of 1 GHz, and a minimum network throughput of 50 Mbps. Assume further that the node labels 220 represent characteristics of second node 132 (shown in FIG. 1), including a memory size of 2 GB, a processor speed of 5 GHz, and a network throughput of 100 Mbps. In this example, the comparison logic 230 may determine that each of the container requirements 210 is satisfied by the corresponding node labels 220, and may thus assign or deploy the container 135D to the second node 132.

In some implementations, the virtualization manager 140 may include stored rules (not shown in FIG. 2) to specify actions performed in response to various comparison results of the comparison logic 230. For example, such rules may specify that a particular comparison result is to cause an alert to be sent to a user, that a container is automatically moved to a different node, that a container is automatically stopped or terminated, and so forth.

Figure 3:
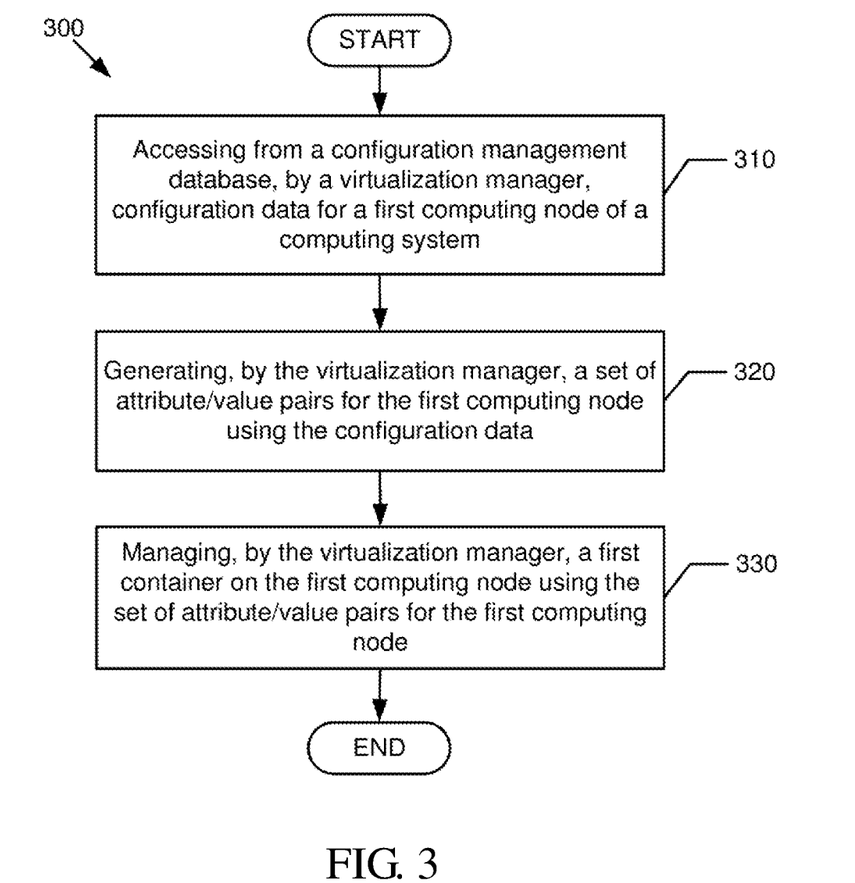
FIG. 3 is a flowchart of an example process, in accordance with some implementations.

Referring now to FIG. 3, shown is a flowchart of an example process 300, in accordance with some implementations. The process 300 may be performed by the system 100 shown in FIG. 1. The process 300 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1-2, which show examples in accordance with some implementations. However, other implementations are also possible.

Block 310 may include accessing from a configuration management database, by a virtualization manager, configuration data for a first computing node of a computing system. For example, referring to FIG. 1, the virtualization manager 140 may interact the configuration management database 120 to access (i.e., read or otherwise receive) stored configuration data associated with the first node 130. Such configuration data may include component identifiers, performance characteristics, hardware and software capabilities, data and network protocols, hardware and software settings, and so forth.

Block 320 may include generating, by the virtualization manager, a set of attribute/value pairs for the first computing node using the configuration data. For example, referring to FIG. 1, the virtualization manager 140 may use the configuration data (accessed at block 310) to generate attribute/value pairs for the first node 130.

Block 330 may include managing, by the virtualization manager, a first container on the first computing node using the set of attribute/value pairs for the first computing node. For example, referring to FIG. 2, the virtualization manager 140 may compare requirements of container 135A to the attribute/value pairs for the first node 130. If the requirements of container 135A are satisfied by the data in the attribute/value pairs for the first node 130, the virtualization manager 140 may deploy container 135A to the first node 130. After block 330, the process 300 is completed. In some implementations, the process 300 may be repeated in a loop to continually generate attribute/value pairs and manage containers accordingly.

Figure 4:
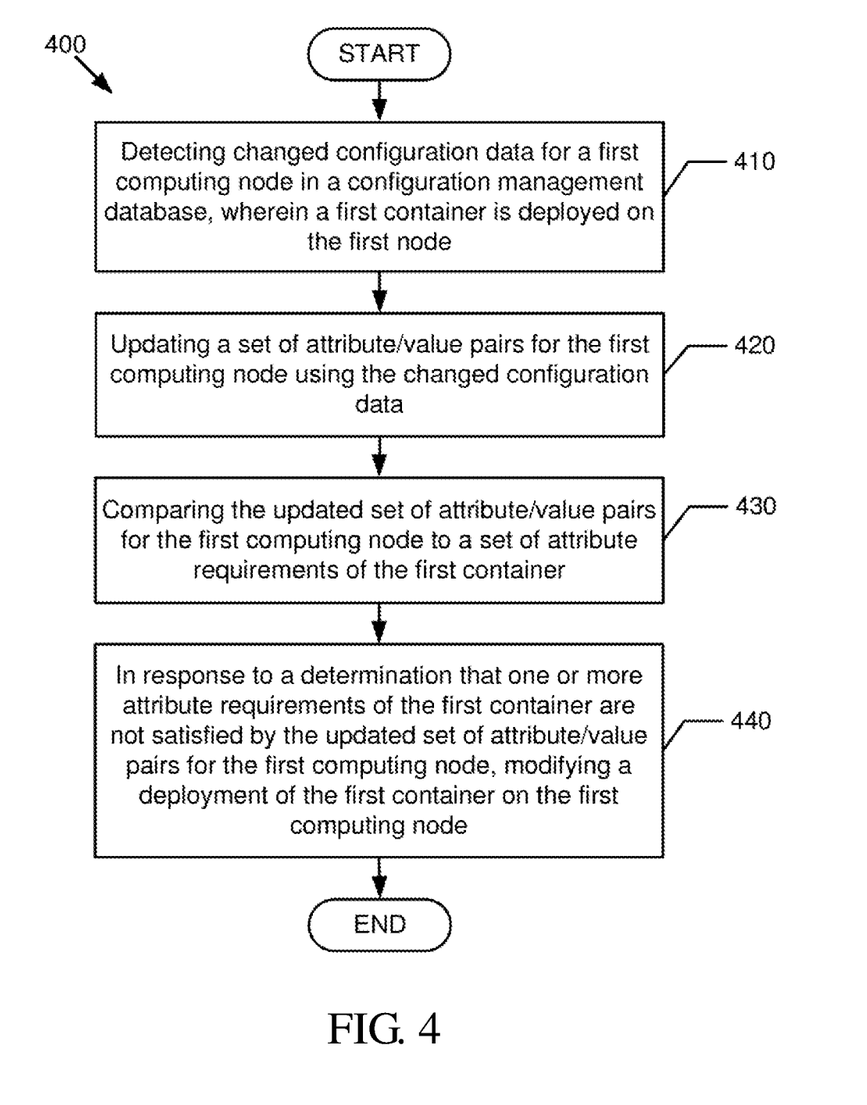
FIG. 4 is a flowchart of an example process, in accordance with some implementations.

Referring now to FIG. 4, shown is a flowchart of an example process 400, in accordance with some implementations. The process 400 may be performed by the system 100 shown in FIG. 1. The process 400 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-2, which show examples in accordance with some implementations. However, other implementations are also possible.

Block 410 may include detecting changed configuration data for a first computing node in a configuration management database, wherein a first container is deployed on the first node. For example, referring to FIG. 1, the virtualization manager 140 may detect a change in configuration data for first node 130. In some implementations, such configuration data may be stored in the configuration management database 120, and may be updated by a configuration discovery process.

Block 420 may include updating a set of attribute/value pairs for the first computing node using the changed configuration data. For example, referring to FIG. 1, the virtualization manager 140 may use the changed configuration data (detected at block 410) to update attribute/value pairs for the first node 130.

Block 430 may include comparing the updated set of attribute/value pairs for the first computing node to a set of attribute requirements of the first container. For example, referring to FIG. 2, the virtualization manager 140 may compare requirements of container 135A to the updated attribute/value pairs for the first node 130.

Block 440 may include, in response to a determination that one or more attribute requirements of the first container are not satisfied by the updated set of attribute/value pairs for the first computing node, modifying a deployment of the first container on the first computing node. For example, referring to FIG. 2, assume that container 135A has been previously deployed to the first node 130. If the virtualization manager 140 determines that the requirements of container 135A are no longer satisfied by the data in the updated attribute/value pairs the first node 130, the virtualization manager 140 may perform a management action to modify the deployment of the container 135A to the first node 130. For example, the virtualization manager 140 may reassign the container 135A to another node (e.g., second node 132), may modify the container 135A, may modify the first node 130, may raise an alarm to notify a user (e.g., a system administrator), and so forth. After block 440, the process 400 is completed. In some implementations, the process 400 may be repeated in a loop to continually update attribute/value pairs and manage containers accordingly.

Figure 5:
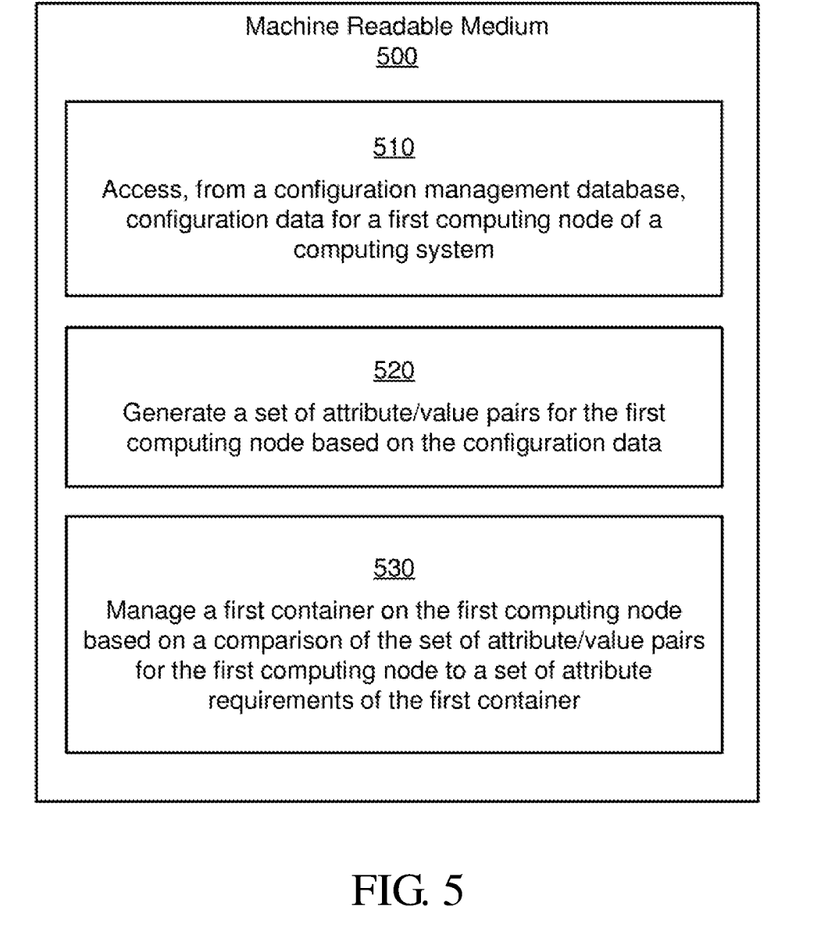
FIG. 5 is a diagram of an example machine-readable storage medium storing instructions in accordance with some implementations.

Referring now to FIG. 5, shown is a machine-readable storage medium 500 storing instructions 510-530, in accordance with some implementations. The instructions 510-530 can be executed by any number of processors (e.g., processor 112 shown in FIG. 1). In some examples, instructions 510-530 may be implemented in the virtualization manager 140 shown in FIGS. 1-2. The machine-readable storage medium 500 may be any non-transitory computer readable medium, such as an optical, semiconductor, or magnetic storage device.

As shown, instruction 510 may access, from a configuration management database, configuration data for a first computing node of a computing system. Instruction 520 may generate a set of attribute/value pairs for the first computing node based on the configuration data. Instruction 530 may manage a first container on the first computing node based on a comparison of the set of attribute/value pairs for the first computing node to a set of attribute requirements of the first container.

Figure 6:
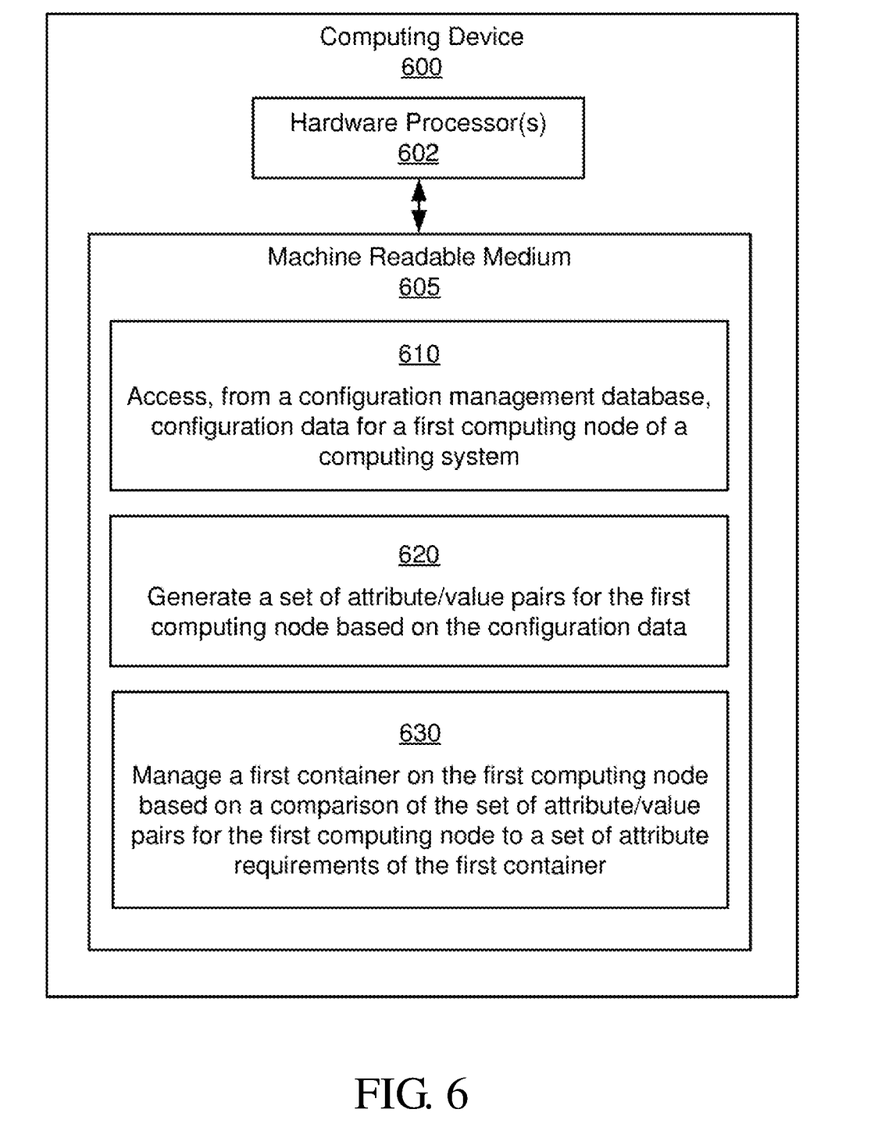
FIG. 6 is a schematic diagram of an example computing device, in accordance with some implementations.

Referring now to FIG. 6, shown is a schematic diagram of an example computing device 600. In some examples, the computing device 600 may correspond generally to the master node 110 shown in FIG. 1. As shown, the computing device 600 may include hardware processor(s) 602 and a machine readable medium 605. The machine readable medium 605 is a non-transitory computer readable medium. The processor(s) 602 may execute instructions 610-630. In some examples, instructions 610-630 may be implemented in the virtualization manager 140 shown in FIGS. 1-2.

Instruction 610 may access, from a configuration management database, configuration data for a first computing node of a computing system. Instruction 620 may generate a set of attribute/value pairs for the first computing node based on the configuration data. Instruction 630 may manage a first container on the first computing node based on a comparison of the set of attribute/value pairs for the first computing node to a set of attribute requirements of the first container.

Note that, while FIGS. 1-6 show example implementations, other implementations are possible. For example, while FIG. 1 shows the virtualization manager 140 to be implemented as instructions stored in the machine-readable storage 116, it is contemplated that some or all of the virtualization manager 140 could be hard-coded as circuitry included in the processor 112 and/or the master node 110. In other examples, some or all of the virtualization manager 140 could be implemented on a remote computer (not shown), as web services, and so forth. In another example, the virtualization manager 140 may be implemented in one or more controllers of the system 100. In yet another example, it is contemplated that the nodes 110, 130, 132 may include additional hardware and/or software components. In still another example, it is contemplated that the virtualization manager 140 may manage other virtualization technologies (e.g., virtual machines) on the first node 130 and second node 132 based on labels generated and/or updated based on the configuration management database 120. Other combinations and/or variations are also possible.

In accordance with some implementations, examples are provided for generating and updating resource labels based on configuration data from a configuration management database (CMDB). As discussed above with reference to FIGS. 1-6, some implementations may provide automated and standardized label generation and update. Further, some implementations may include using the generated and updated labels to automatically manage containers on one or more nodes. Accordingly, some implementations may provide automated management of containers and associated labels in an efficient manner.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A computer implemented method comprising:
accessing a configuration management database, by a virtualization manager, to obtain configuration data of a first computing node and configuration data of a first container, wherein the configuration data of the first computing node includes an identifier of the first computing node and data indicating a capacity of the first computing node, and wherein the configuration data of the first container includes an identifier of the first container and requirements of the first container;
based on the configuration data of the first computing node, generating, by the virtualization manager, a label of the first computing node, wherein the label of the first computing node comprises an attribute/value pair that specifies the identifier of the first computing node and the capacity of the first computing node;
based on the configuration data of the first container, generating, by the virtualization manager, a label of the first container, wherein the label of the first container comprises an attribute/value pair that specifies the identifier of the first container and the requirements of the first container;
comparing, by the virtualization manager, the label of the first container to the label of the first computing node to determine whether the capacity specified in the label of the first computing node satisfies the requirements specified in the label of the first container;
deploying, by the virtualization manager, the first container on the first computing node based on a determination that the capacity specified in the label of the first computing node satisfies the requirements specified in the label of the first container;
subsequent to deploying the first container on the first computing node, automatically detecting, by the virtualization manager, a change in the capacity of the first computing node;
in response to automatically detecting the change in the capacity of the first computing node, automatically updating, by the virtualization manager, the label of the first computing node to reflect the change in the capacity of the first computing node; and
managing, by the virtualization manager, the first container on the first computing node based on the updated label of the first computing node by:
comparing the label of the first container to the updated label of the first computing node;
determining that the requirements specified in the label of the first container are not satisfied by the change in capacity specified in the updated label of the first computing node; and
in response to the determining, performing at least one of moving the first container to a second computing node that satisfies the label of the first container and terminating the first container on the first computing node.

2. The computer implemented method of claim 1, further comprising:
generating a report on performance metrics of the first computing node and the first container based on the updated label of the first computing node and the label of the first container.

3. The computer implemented method of claim 1, further comprising:
accessing the configuration management database to detect the change in the capacity.

4. The computer implemented method of claim 1, wherein updating the label of the first computing node includes modifying the attribute/value pair of the first computing node to reflect the change in the capacity of the first computing node.

5. The computer implemented method of claim 1, wherein performing the managing of the first container comprises one selected from generating a user alert regarding the first container, performing an analysis of the first container, and generating a report regarding the first container.

6. An article comprising a non-transitory machine-readable storage medium storing instructions that upon execution cause a processor of a virtualization manager to:
access a configuration management database to obtain configuration data of a first computing node and configuration data of a first container, wherein the configuration data of the first computing node includes an identifier of the first computing node and data indicating a capacity of the first computing node, and wherein the configuration data of the first container includes an identifier of the first container and requirements of the first container;
based on the configuration data of the first computing node, generate a label of the first computing node, wherein the label of the first computing node comprises an attribute/value pair that specifies the identifier of the first computing node and the capacity of the first computing node;
based on the configuration data of the first container, generate a label of the first container, wherein the label of the first container comprises an attribute/value pair that specifies the identifier of the first container and the requirements of the first container;
compare the label of the first container to the label of the first computing node to determine whether the capacity specified in the label of the first computing node satisfies the requirements specified in the label of the first container;
deploy the first container on the first computing node based on a determination that the capacity specified in the label of the first computing node satisfies the requirements specified in the label of the first container;
subsequent to deploying the first container on the first computing node, automatically detect a change in the capacity of the first computing node;
in response to automatically detecting the change in the capacity of the first computing node, automatically update the label of the first computing node to reflect the change in the capacity of the first computing node; and
manage the first container on the first computing node based on the updated label of the first computing node by:
comparing the label of the first container to the updated label of the first computing node;
determining that the requirements specified in the label of the first container are not satisfied by the change in capacity specified in the updated label of the first computing node; and in response to the determining, performing at least one of moving the first container to a second computing node that satisfies the label of the first container and terminating the first container on the first computing node.

7. The article of claim 6, wherein the instructions, upon execution, cause the processor of the virtualization manager to:
in response to a determination that the requirements specified in the label of the first container are satisfied by the change in capacity specified in the updated label of the first computing node, continue the deployment of the first container on the first computing node.

8. The article of claim 6, wherein, the instructions cause the processor of the virtualization manager to:
generate a report on performance metrics of the first computing node and the first container based on the updated label of the first computing node and the label of the first container.

9. The article of claim 6, wherein the instructions cause the processor of the virtualization manager to:
access the configuration management database to detect the change in the capacity of the first computing node.

10. The article of claim 6, wherein the management of the first container comprises a redeployment of the first container to a second computing node.

11. The article of claim 6, wherein the management of the first container comprises a generation of a user alert regarding the first container.

12. A computing device, comprising:
a hardware processor; and
a machine-readable storage medium storing instructions executable by the hardware processor to:
access a configuration management database to obtain configuration data of a first computing node and configuration data of a first container, wherein the configuration data of the first computing node includes an identifier of the first computing node and data indicating a capacity of the first computing node, and wherein the configuration data of the first container includes an identifier of the first container and requirements of the first container;
based on the configuration data of the first computing node, generate be a label of the first computing node, wherein the label of the first computing node comprises an attribute/value pair that specifies the identifier of the first computing node and the capacity of the first computing node;
based on the configuration data of the first container, generating, by a virtualization manager, a label of the first container, wherein the label of the first container comprises an attribute/value pair that specifies the identifier of the first container and the requirements of the first container;
compare the label of the first container to the label of the first computing node to determine whether the capacity specified in the label of the first computing node satisfies the requirements specified in the label of the first container;
deploy, by the virtualization manager, the first container on the first computing node based on a determination that the capacity specified in the label of the first computing node satisfies the requirements specified in the label of the first container;
subsequent to deploying the first container on the first computing node, automatically detect a change in the capacity of the first computing node;
in response to automatically detecting the change in the capacity of the first computing node, automatically update the label of the first computing node to reflect the change in the capacity of the first computing node; and
manage the first container on the first computing node based on the updated label of the first computing node by:
comparing the label of the first container to the updated label of the first computing node;
determining that the requirements specified in the label of the first container are not satisfied by the change in capacity specified in the updated label of the first computing node; and
in response to the determining, performing at least one of moving the first container to a second computing node that satisfies the label of the first container and terminating the first container on the first computing node.

13. The computing device of claim 12, wherein the instructions are executable by the hardware processor to:
in response to a determination that the requirements specified in the label of the first container are satisfied by the change in capacity specified in the updated label of the first computing node, continue the deployment of the first container on the first computing node.

14. The computing device of claim 12, wherein the instructions are executable by the hardware processor to:
generate a report on performance metrics of the first computing node and the first container based on the updated label of the first computing node and the label of the first container.

15. The computing device of claim 12, wherein, to manage the first container on the first computing node, the instructions are executable by the hardware processor to:
in response to a determination that the change in capacity specified in the updated label of the first computing node does not satisfy the requirements specified in the label of the first container, perform one of: generating a user alert regarding the first container, performing an analysis of the first container, and generating a report regarding the first container.

16. The computing device of claim 12, wherein the instructions are executable by the hardware processor to:
access the configuration management database to detect the change in the capacity.

* * * * *